(No Model.) 2 Sheets—Sheet 1.

R. ALEXANDER, G. F. PAYNE & C. H. MANN.
METHOD OF MAKING GAS INCANDESCENT MANTLES.

No. 575,194. Patented Jan. 12, 1897.

Witnesses:
Edw. D. Duvall Jr.
A. W. Bayard.

Inventors
Robert Alexander,
George F. Payne,
Charles H. Mann,
per Fred. D. Facker, Atty.

(No Model.) 2 Sheets—Sheet 2.
R. ALEXANDER, G. F. PAYNE & C. H. MANN.
METHOD OF MAKING GAS INCANDESCENT MANTLES.
No. 575,194. Patented Jan. 12, 1897.
Fig. 8. Fig. 9. Fig. 10.
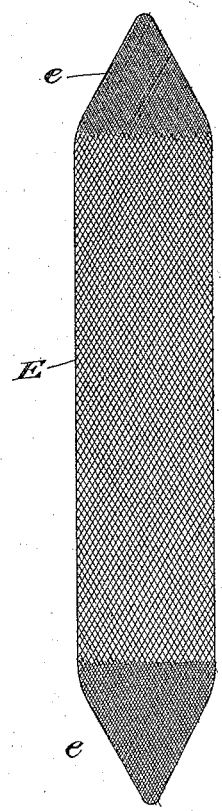 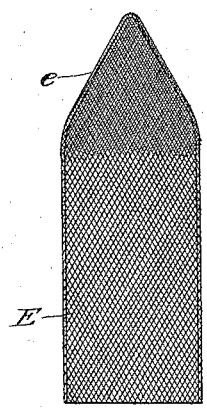 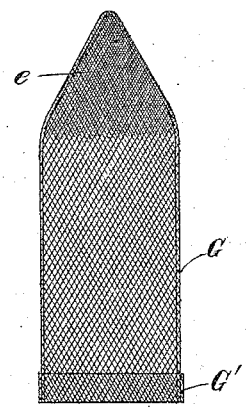
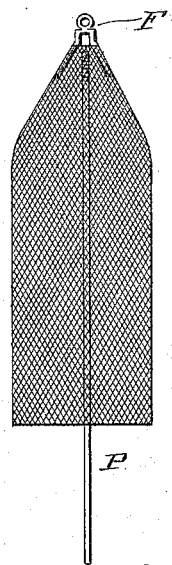
Fig. 11.
Witnesses
Edw. D. Duvall Jr.
A. W. Bayard.
Inventors.
Robert Alexander,
George F. Payne,
Charles H. Mann,
per Fred. G. Dieterich,
Atty.

UNITED STATES PATENT OFFICE.

ROBERT ALEXANDER, GEORGE F. PAYNE, AND CHARLES H. MANN, OF PHILADELPHIA, PENNSYLVANIA, ASSIGNORS TO LOUIS H. HALL, OF SAME PLACE.

METHOD OF MAKING GAS-INCANDESCENT MANTLES.

SPECIFICATION forming part of Letters Patent No. 575,194, dated January 12, 1897.

Application filed March 28, 1896. Serial No. 585,253. (No specimens.)

*To all whom it may concern:*

Be it known that we, ROBERT ALEXANDER, GEORGE F. PAYNE, and CHARLES H. MANN, citizens of the United States, residing at Philadelphia, in the county of Philadelphia and State of Pennsylvania, have invented certain new and useful Improvements in Methods of Making Gas-Incandescent Mantles; and we do hereby declare the following to be a full, clear, and exact description of the invention, such as will enable others skilled in the art to which it appertains to make and use the same.

Our invention relates to a method of making mantles or hoods for use in gas-incandescents, the object being to provide a mantle having greater durability and strength and capable of emitting a more intense and brilliant light when incandesced than mantles now in common use.

The invention refers to the class of skeleton mantles, hoods, or frames that are produced by impregnating a thin burnable fabric with a solution of the metallic salts of refractory earths suitable when oxidized for an incandescent, and then applying heat to destroy the fabric and leave behind the infusible oxid in form and shape suitable to serve as an incandescing body in a gas-flame.

Our present improved method of constructing the hood or mantle employs the process just referred to, but consists in certain steps or operations whereby a mantle of a peculiar form and of an especially substantial character, comprising, essentially, an infolded tubular strip or double mantle, is produced. One important desideratum in the making of these articles is the strengthening or reinforcing of one part of the mantle for the purpose of permitting a supporting device to be attached to the reinforced part to uphold the mantle without injury to the delicate skeleton texture thereof, and our invention seeks to supply this end. Our invention therefore embraces a method of making incandescent hoods which follows the various operations hereinafter described, and then more particularly pointed out in the claims.

Figure 1:
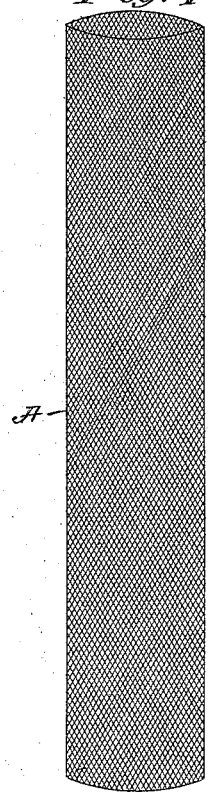
Figure 2:
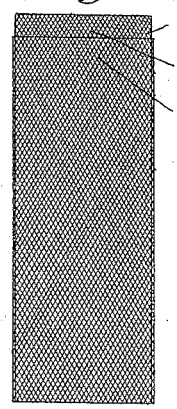
Figure 3:
Figure 4:
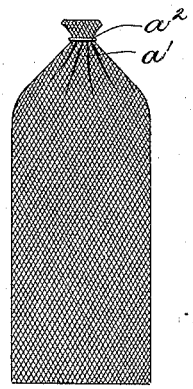
Figure 5:
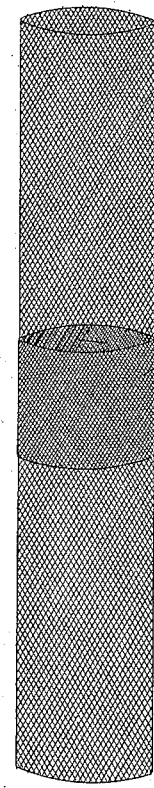
Figure 6:
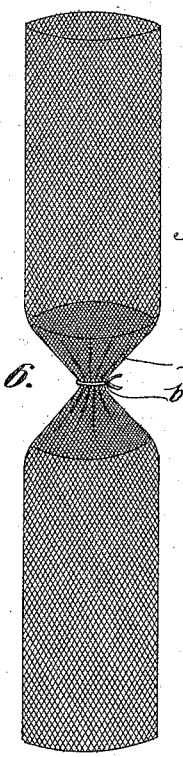
Figure 7:
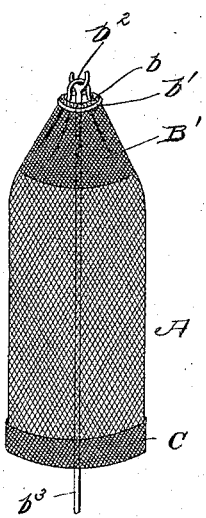

In the annexed drawings, illustrating different ways in which our invention may be carried into practical effect, Figure 1 is a plan view of a tubular strip of fabric having a uniform diameter throughout and designed to be folded to form a double mantle. Fig. 2 is a view of the strip shown in Fig. 1 after it has been infolded to form a tubular strip of half the length of that in Fig. 1. Fig. 3 is a view of the same article shown in Fig. 2 with the free edges overlapping and secured together. Fig. 4 is a side elevation of a complete mantle formed by the method indicated in Figs. 1, 2, and 3, the top of the mantle being drawn together in a conical form and secured by an encircling cord or wire. Fig. 5 is a plan view of a tubular strip of fabric having a uniform diameter throughout, the same as in Fig. 1, but with the central portion strengthened and thickened. Fig. 6 is a view of the same fabric shown in Fig. 5, but with a cord or wire encircling tightly the central portion thereof and constricting it. Fig. 7 is a side elevation of the completed mantle produced from the strip shown in Figs. 5 and 6. Fig. 8 is a plan view of a tubular strip of fabric for forming a double mantle, said strip having its ends woven in conical form. Fig. 9 is a side elevation of a double mantle formed by folding one end of the strip shown in Fig. 8 within the other end of said strip telescopically to provide a double-walled hood of one piece. Fig. 10 is a side elevation of a double mantle composed of two conical-ended pieces, one of which is inserted inside of the other and the lower end of both bound together in some suitable way. Fig. 11 is a detail view showing an eye or support attached to the upper end of a conical-ended mantle for use wherewith the vertical support of the mantle may be engaged.

Similar letters of reference designate corresponding parts through the different figures of the drawings.

Our invention proceeds upon the principle of first forming a tubular piece of thin, light, textile fabric of suitable length to enable it to be telescopically infolded or turned reversely and inwardly upon itself, that is to say, in common parlance, turned wrong side out, for a certain distance, say half of its length, in order that a double mantle of normal length for practical use, having two parallel concentric portions integral with each other, may be the result. We have already stated that it is our purpose to provide a mantle or hood consisting of a textile fabric saturated with a solution of the salts of the rarer earths capable of giving light by incandescence, the textile material of which is subsequently burned away, so that the mantle when ready for use consists of a skeleton network of earthy substance. The tubular strip of textile fabric, which in the performance of our method is first produced, is therefore saturated throughout with a solution of the salts of refractory earths suitable when oxidized for an incandescent. As the tubular blank is bent upon itself to form the double walls of an integral hood, it is evident that said blank may either be saturated throughout with the same solution or its opposite ends, which are to form the parallel walls of the resulting hood, may be saturated with different solutions. The impregnation of the fabric with the solution of metallic salts may take place either before or after it is folded. When the entire mantle is to be impregnated with the same solution, it may easily be dipped into the saturating solution after it has been folded into its mantle form, but when the opposite ends are to be saturated with different solutions it is obvious that the saturation should take place prior to the folding. We do not wish to be restricted to any particular operation for destroying the original combustible textile frame on which by impregnation the infusible incandescing body is formed, but reserve the liberty of burning out the textile material in any approved and satisfactory manner. The preëminent benefit and advantage accomplished by providing a double-walled integral hood made by infolding a single tubular strip of textile fabric is that a light far greater in intensity and of a more dazzling brilliance is obtained than is possible with the single hood; and also the double hood has a greater durability and strength than the single hood. The increase in cost is trifling, and is far outweighed by the great increase of advantages.

We will now explain in detail the way in which our process is carried out.

Referring first to Figs. 1, 2, 3, and 4, it will be noted that we provide a textile fabric A, which is of tubular form and has a uniform diameter throughout. One end of this tubular fabric A, as A' or A², is folded telescopically upon or within the other end, the strip A being, as it were, turned wrong side out until it assumes half its original length, one original half being inside of the other original half, and there thus being provided two integral walls concentric and parallel with each other. This result is indicated in Figs. 2 and 3. In this folding one end of the tube into the other end it is preferable to allow one of the free ends to project slightly beyond the other free end, in order that said projecting edge, which we have designated by the reference-letter $a$, may be caused to overlap the other free edge, forming a selvage which can be stitched to the other free edge, and the two free ends of the mantle thus secured tightly together, as shown in Fig. 3. The double mantle thus formed will have its upper end drawn together or contracted, as shown at $a'$, in order that the upper end may be closed, or substantially so, and this is accomplished by encircling the upper end of the double-walled tube with a wire or cord $a^2$ of some suitable material—as, for instance, asbestos—which is tied tightly around the fabric, thereby drawing the same together, as shown at $a'$, no opening being left in this end except such as may be necessary for the passage therethrough of the vertical supporting-rod which sustains and upholds the mantle and which is indicated in Fig. 11 by the reference-letter P.

Referring to Figs. 5, 6, and 7, it will be observed that we employ a tubular strip A of the same kind as that shown in Fig. 1, but this strip is woven in such a manner that the central portion B has an extra number of threads, so as to strengthen and thicken the tubular strip for a certain distance, reinforcing the same at that point, so that when the folding of one end of the strip upon the other has taken place the result will be that the folded end will be much stronger than if it were made simply of the usual thickness. We do not confine ourselves to any particular machine or method of increasing the thickness and strength of the fabric at its central part, but it will be clearly understood by those skilled in the art of weaving that this thickening may be accomplished in other manifold different ways. Around the reinforced section B we tie an asbestos cord, wire, or other suitable encircling device, for the purpose of contracting the central portion B, as shown in Fig. 6. After this has been done one end of the tubular fabric is turned upon the other end, as shown in Fig. 7, the constricting-cord $b$ being thereby covered by the folded part of the fabric, and a double-walled hood being thus produced whose walls have their free lower edges contiguous to each other at the base of the mantle, which edges may be secured together by means of stitching or in any other way, or an enveloping tape or band of fabric C may be stitched around the two edges to tightly connect them together. After the mantle has been thus folded we find it convenient to tie around the upper reinforced end thereof, at a point directly below the point where the now covered asbestos cord $b$ is situated, an external constricting-cord $b'$, and this cord $b'$ may be connected together by an overarching connecting-cord $b^2$. The cord $b'$ will not be tied so tightly but that a central orifice or opening may be left centrally within the same, through which the vertical supporting-rod $b^3$ may pass upwardly, the upper end of said rod being forked, as shown in Fig. 7, to engage a connecting-cord $b^2$ and thereby support the mantle.

When the mantle is produced by the method of manufacture illustrated in detail in Figs. 5, 6, and 7, of which we have just been speaking, it will be manifest that the upper end B' of said mantle will have an extra amount of strength, and consequently an increased durability and value, by reason of the fact of its having been made from the central reinforced strip shown in Fig. 5.

In Figs. 8, 9, and 10 we have illustrated a conical-ended mantle and depicted the various steps in the formation of the same. In Fig. 8 we have illustrated an elongated tubular strip of textile fabric E, which is similar to the tubular strip A, excepting that its opposite ends $e$ $e$ are woven in conical shape, that is to say, these ends are gradually reduced from the central cylindrical form of the main portion of the strip E to pointed ends. The strip thus woven with pointed or conical ends is telescopically infolded in like manner as the tubular strips illustrated in Figs. 1 and 5 are reversely infolded upon themselves, respectively, with the result that the conical-ended mantle illustrated in Fig. 9 is produced, said mantle consisting of parallel walls, the conical portions $e$ $e$ lying in contact with each other at the top of the mantle, and a double-walled conical hood being thus formed out of a single piece of material. A hood with its upper end of cone form is deemed far superior to the ordinary form of mantle where the contracted upper end is produced by crowding the material together under the force of a constricting cord or wire, which irregular crowded and unsightly upper end is very objectionable, it having little or no incandescing property.

With the conical-ended mantle of the form shown in Figs. 8, 9, and 10, where the conical form is woven in the mantle and the mantle is therefore of a uniform texture throughout, it is possible to so incandesce the mantle that it will emit light to its very tip at the upper end, and consequently the brilliancy and perfection of the illuminating properties of the mantle will be greatly enhanced by the improvement in its form. When the mantle is of the conical form, we find it convenient to insert into the apex thereof a metallic eye F, as shown in Fig. 11, of some suitable kind, with which the vertical support engages. This eye F is used to hang the mantle on while the burning-out process is being carried on. A similar device may also be used for normally supporting the mantle in operative position in connection with a gas-burner.

In Fig. 10 we have represented a double mantle consisting of two conical-ended pieces, the one inserted within the other, but not made integral according to our method, as hitherto set forth. Said pieces G and G' are so related that one of them, as G', will be longer than the other one, as G, in order that it may be folded up around the bottom of the piece G and bound thereto by stitching or other means, in order to firmly connect the two parts together. Other means for binding the two mantles together may be employed, if desired, as, for instance, a separate piece of fabric stitched around the edges of parts G and G'.

It will be understood that in forming a mantle as described there is produced a light-emitting surface which is double the size of a single mantle, and the fact that this light-emitting surface consists of two parts, one parallel to the other, so that the light which radiates from the one commingles with the light radiating from the other, must of necessity increase the intensity and brilliancy of the mantle as an illuminant. By charging the two infolded double sections of the mantle with the proper solution, or solutions when different ones are employed for the two parts, it will be found that the value and efficiency of the light can be varied and so changed as to adapt the light for different uses. The character of the color of the light produced by the blended radiance from the two contiguous mantle-sections can be easily regulated by the character of the impregnating solutions. The outer wall of the mantle may be charged with a solution producing one color, and the inner wall with a solution producing another color, it being known that the union of the two colors will cause a light of a certain desired character, and thus by a proper regulation of the impregnating solutions it will be understood how the resultant light-rays may be predetermined and controlled. Thus the use of the double mantle opens a wide field for the adaptation of gas-incandescents in the production of differently-colored lights.

Having thus described our invention, what we claim as new, and desire to secure by Letters Patent, is—

1. A method of making gas-incandescent mantles, which consists in forming a tubular fabric having a central portion thickened or reinforced, saturating its opposite ends with differently-prepared solutions of the metallic salts of refractory earths which are suitable when oxidized for an incandescent, contracting the central thickened portion by encircling it with constricting means, then turning the fabric telescopically upon itself to produce a double mantle, and then applying heat to destroy the textile fabric and leave the infusible earthy oxids in the form of a double skeleton mantle.

2. A method of making gas-incandescent mantles, which consists in forming a tubular fabric having a central portion thickened or reinforced, saturating its opposite ends with differently-prepared solutions of the metallic salts of refractory earths which are suitable when oxidized for an incandescent, then turning the fabric telescopically upon itself to produce a double mantle, and then applying heat to destroy the textile fabric and leave the infusible earthy oxids in the form of a double skeleton mantle.

3. A method of making gas-incandescent mantles, which consists in forming a tubular fabric having a central thickened portion, saturating its opposite ends with differently-prepared solutions of the metallic salts of refractory earths which are suitable when oxidized for an incandescent, contracting said central portion by encircling it with a cord or equivalent device, turning one part telescopically upon the other, and thereby forming an integral double mantle, securing the free edges of the telescoped parts, and then applying an outer constricting-cord to the folded end, and then applying heat to destroy the textile fabric and leave the infusible earthy oxids in the form of a double skeleton mantle.

4. A method of making gas-incandescent mantles, which consists in forming a tubular fabric, saturating its opposite ends with differently-prepared solutions of the metallic salts of refractory earths, which are suitable when oxidized for an incandescent, turning it telescopically upon itself to produce a double mantle, and then applying heat to destroy the fabric and leave the infusible skeleton oxid.

5. A method of making gas-incandescent mantles, which consists in forming a tubular fabric having a central portion thickened or reinforced, saturating it with a solution of the metallic salts of mineral earths suitable when oxidized for an incandescent, turning it telescopically upon itself to produce a double mantle, uniting the free adjoining edges of the fabric, and then applying heat to destroy the fabric and leave an infusible skeleton oxid.

6. A method of making gas-incandescent mantles, which consists in forming a tubular fabric, saturating its opposite ends with differently-prepared solutions of the metallic salts of refractory earths which are suitable when oxidized for an incandescent, then turning the fabric telescopically upon itself to produce a double mantle, and then applying heat to destroy the textile fabric and leave the infusible earthy oxids in the form of a double skeleton mantle.

In testimony whereof we affix our signatures in presence of two witnesses.

R. ALEXANDER.
GEORGE F. PAYNE.
CHARLES H. MANN.

Witnesses:
HENRY G. SWAYNE,
SAMUEL MCDOWELL.